United States Patent [19]

Kobayashi

[11] Patent Number: 4,887,117

[45] Date of Patent: Dec. 12, 1989

[54] CAMERA HAVING AUTO-FOCUS DEVICE

[75] Inventor: Ryuichi Kobayashi, Kawasaki, Japan

[73] Assignee: Canon Kabushiki Kaisha, Tokyo, Japan

[21] Appl. No.: 243,700

[22] Filed: Sep. 13, 1988

[30] Foreign Application Priority Data

Sep. 18, 1987 [JP] Japan ................................ 62-234574

[51] Int. Cl.⁴ ........................ G03B 3/00; G03B 7/091; G03B 17/38
[52] U.S. Cl. .................................... 354/400; 354/410; 354/266
[58] Field of Search ................. 384/400, 402, 410, 266

[56] References Cited

U.S. PATENT DOCUMENTS 4,411,505 10/1983 Sakai et al. ........................... 354/406
4,474,447 10/1984 Kawabata et al. ................... 354/406
4,607,931 8/1986 Aihara .................................. 354/400
4,688,914 8/1987 Sakai et al. ....................... 354/173.11
4,693,582 9/1987 Kawamura et al. ................. 354/403
4,801,962 1/1989 Akashi ................................. 354/402

Primary Examiner—W. B. Perkey
Attorney, Agent, or Firm—Fitzpatrick, Cella, Harper & Scinto

[57] ABSTRACT

A camera with an auto-focus device and having a first mode for causing the auto-focus device to perform focusing upon operation of a second operating member independently of a release operation member and a second mode for causing the auto-focus device to perform focusing upon operation of the release operation member and interrupting focusing of the auto-focus device upon operation of the second operation member.

7 Claims, 4 Drawing Sheets

CAMERA HAVING AUTO-FOCUS DEVICE

BACKGROUND OF THE INVENTION

1. Field of the Invention

The present invention relates to a camera having auto-focus and auto-exposure functions.

2. Related Background Art

An operator can perform focusing and exposure operations at any time in a manually operated conventional camera.

In most of the recent auto-focus, auto-exposure cameras, focusing and exposure operations are automatically initiated upon depression of a shutter release button according to a first scheme. The first scheme allows even a beginner to perform easy auto-focusing and auto-exposure. However, highly technical photography cannot be performed wherein an object subjected to focusing is different from an object subjected to exposure control.

In another auto-focus, auto-exposure camera according to a second scheme, unlike the first scheme wherein auto-focus and auto-exposure operations are simultaneously started upon depression of a shutter release button, an auto-focus lock button and an auto-exposure lock button are provided to perform focusing and exposure operations at different times. According to the second scheme, after an object subjected to focusing is focused, a photometric operation is performed for an object subjected to exposure control while the auto-focus lock button is kept depressed, thus resulting in poor operability and inconvenience.

According to a third scheme, start buttons for auto-exposure and auto-focus operations are arranged, and the start of operation and the holding of the operation can be independently performed. According to the third scheme, the auto-focus start button is depressed to auto-focus an object, and then the auto-focus start button is released to maintain an auto-focused state. In this state, the camera is panned to an object subjected to exposure control. The auto-exposure start button is then depressed to perform a photometric operation. In this manner, auto-focus and auto-exposure operations can be independently performed. A camera employing this scheme can be conveniently used by a skilled user. However, operations are still complicated, and the camera of this type is not suitable for a beginner.

Thus, the conventional schemes have both advantages and disadvantages.

The conventional camera of the first scheme cannot allow highly technical photography in which an object subjected to auto-focus is different from an object subjected to exposure control. The conventional camera of the second scheme requires complicated operations in which an object subjected to auto-focus is focused and then the camera is panned to an object subjected to exposure control so as to perform the photometric operation while the auto-focus lock button is kept depressed, thereby degrading operability and resulting in inconvenience. The conventional camera of the third scheme can be conveniently used by a skilled user since the auto-focus and auto-exposure operations can be independently performed but is not suitable for a beginner.

SUMMARY OF THE INVENTION

One aspect of the invention is to provide a camera which can solve the conventional drawbacks described above.

Another aspect of the invention is to provide a camera wherein focus detection and focusing are performed while a first operation member is manipulated in the first mode; and in the second mode, focus detection and focusing are performed until the first operation member is manipulated, and focus detection and focusing are interrupted upon operation of the first operation member.

Still another aspect of the invention is to provide a camera wherein in the first mode, focus detection and focusing are performed independently of a photometric operation; and in the second mode, the photometric operation is performed during at least focus detection and focusing.

Still another aspect of the invention is to provide a camera wherein in the first mode, a photometric operation is performed by a release member independently of the first operation member; and in the second mode, focus detection, focusing, and a photometric operation are performed upon operation of the release member.

Other objects, features, and advantages of the present invention will be apparent from the following description of the preferred embodiment in conjunction with the accompanying drawings.

BRIEF DESCRIPTION OF THE DRAWINGS

FIG. 3, 3A and 3B comprise a flow chart for explaining the operations of the camera (FIG. 1) and the circuit (FIG. 2).

DESCRIPTION OF THE PREFERRED EMBODIMENT

Figure 1:
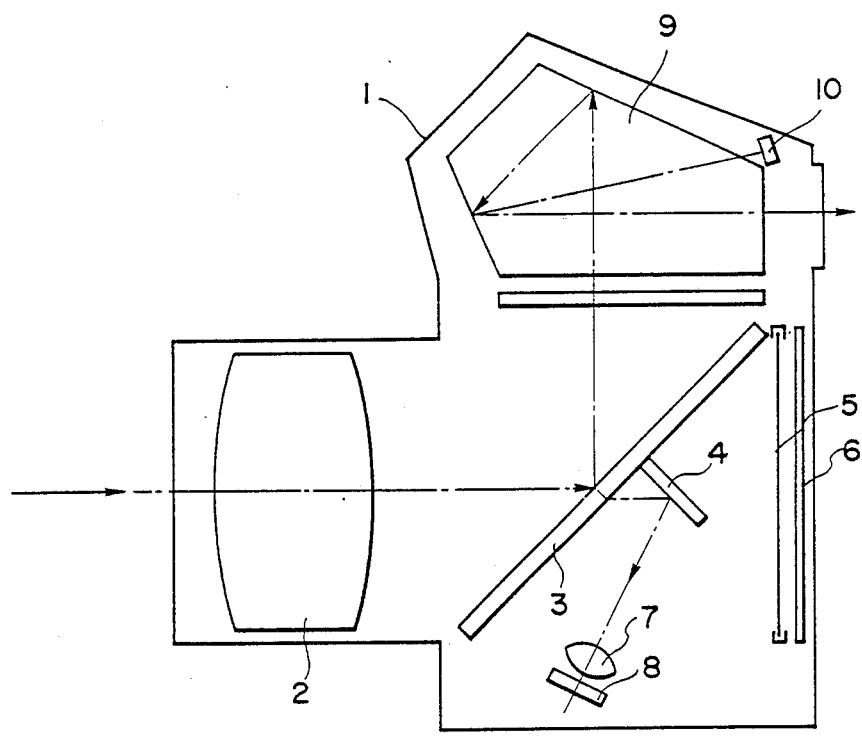
FIG. 1 is a sectional side view of a camera according to an embodiment of the present invention.

Referring to FIG. 1, a camera includes a camera body 1, a photographing lens 2, a half mirror 3, a submirror 4, a shutter 5, a film 6, a lens 7, a distance-measuring line sensor 8 located at a position equivalent to the film surface to receive image information of an object, a penta prism 9, and a photometric photodiode 10 for measuring brightness of the object.

Figure 2:
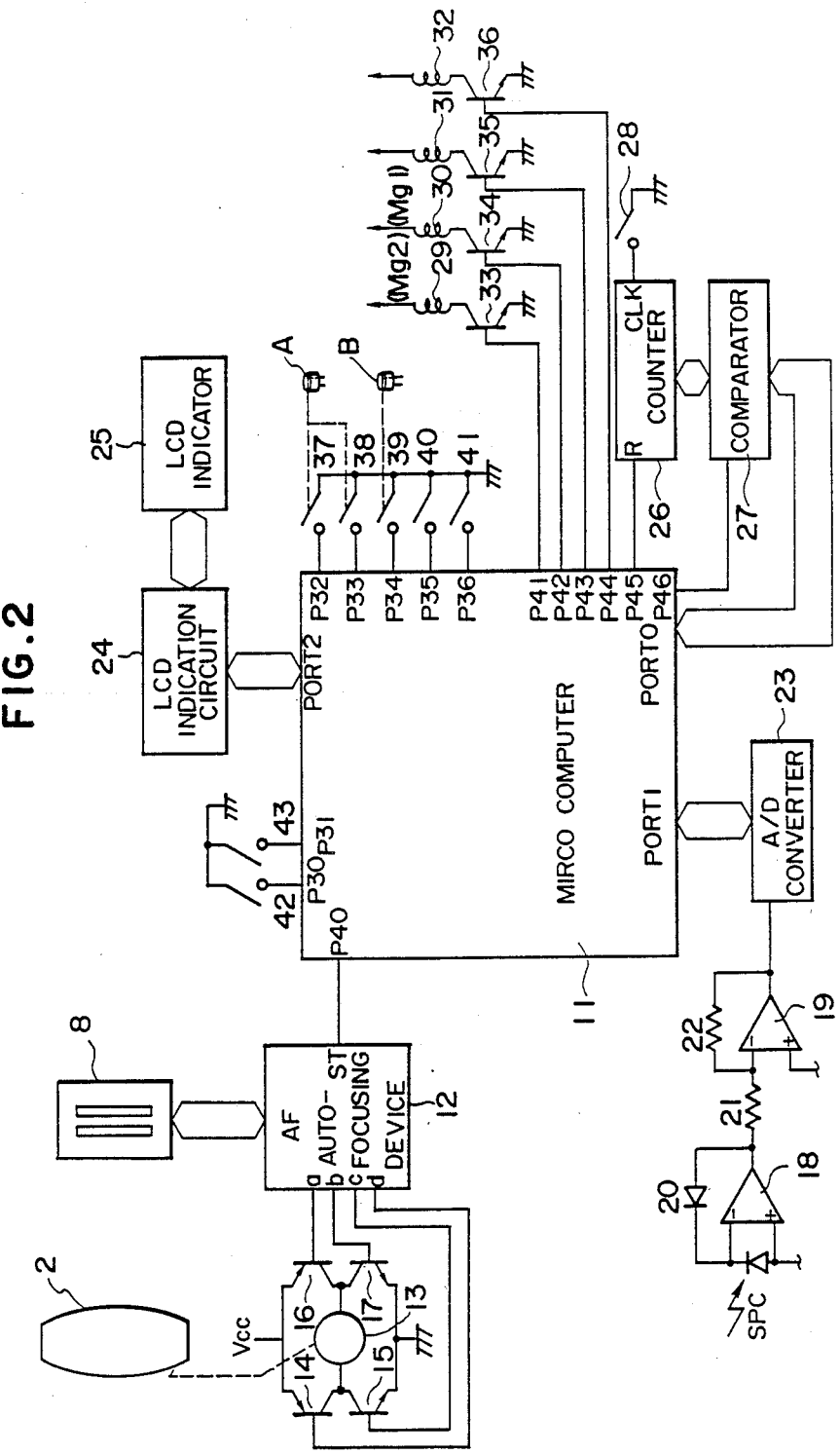
FIG. 2 is a diagram of an electrical circuit incorporated in the camera shown in FIG. 1.

FIG. 2 shows, an electrical circuit incorporated in the camera of FIG. 1.

Referring to FIG. 2, the circuit includes a microcomputer 11 for controlling the overall operations of the camera. The microcomputer 11 includes an 8-bit input port PORT1, 8-bit output ports PORT2 and PORT0, input ports P30, P31, P32, P33, P34, P35, and P36, and output ports P40, P41, P42, P43, and P44.

The circuit also includes an auto-focusing device 12, a motor 13 for driving the photographing lens 2 to perform focusing, transistors 14, 15, 16, and 17 for driving the motor 13, operational amplifiers 18 and 19, a logarithmic compression diode 20, resistors 21 and 22, an A/D converter 23, and a known LCD indication circuit 24. The LCD indication circuit 24 can indicate an aperture value (or F-number) and a time value (or shutter speed), or a numeric value of 0 or 1 in accordance with a signal appearing at the port PORT2. The circuit further includes an LCD indicator 25, a counter 26 for counting clock inputs CLK in response to trailing edges of reset inputs R, a magnitude comparator 27 for comparing an output from the counter 26 with a value from the output port PORT0 of the microcomputer 11 and outputting a signal of logic "1" when the outputs coincide with each other, and a switch 28 which is turned on and off every time a stop-down operation is performed by one step. The circuit also includes a magnet 29 energized to control the aperture of the camera, a magnet 30 energized to release a set state of the camera, a magnet 31 energized to drive a front curtain of the shutter, a magnet 32 energized to drive a rear curtain of the shutter, and transistors 33, 34, 35, and 36. The circuit also includes a photometric switch 37 (to be referred to as a switch SW1 hereinafter) which is turned on upon first-stroke depression of the shutter release button, an exposure start switch 38 (to be referred to as a switch SW2 hereinafter) which, is turned on upon 2-stroke depression of the shutter release button, and an AF lock switch 39 (to be referred to as a switch SWAF hereinafter) as a characteristic feature of the present invention. The circuit also includes a function setting switch 40 (to be referred to as a switch SWMF hereinafter), a switch 41 (to be referred to as a switch SWMRUP hereinafter) which is interlocked with the mirror 3 and turned on when the mirror 3 is pivoted upward, a switch 42 (to be referred to as a switch SWUP hereinafter) for increasing an aperture value, and a switch 43 (to be referred to as a switch SWDN hereinafter) for decreasing the aperture value.

Figure 3A:
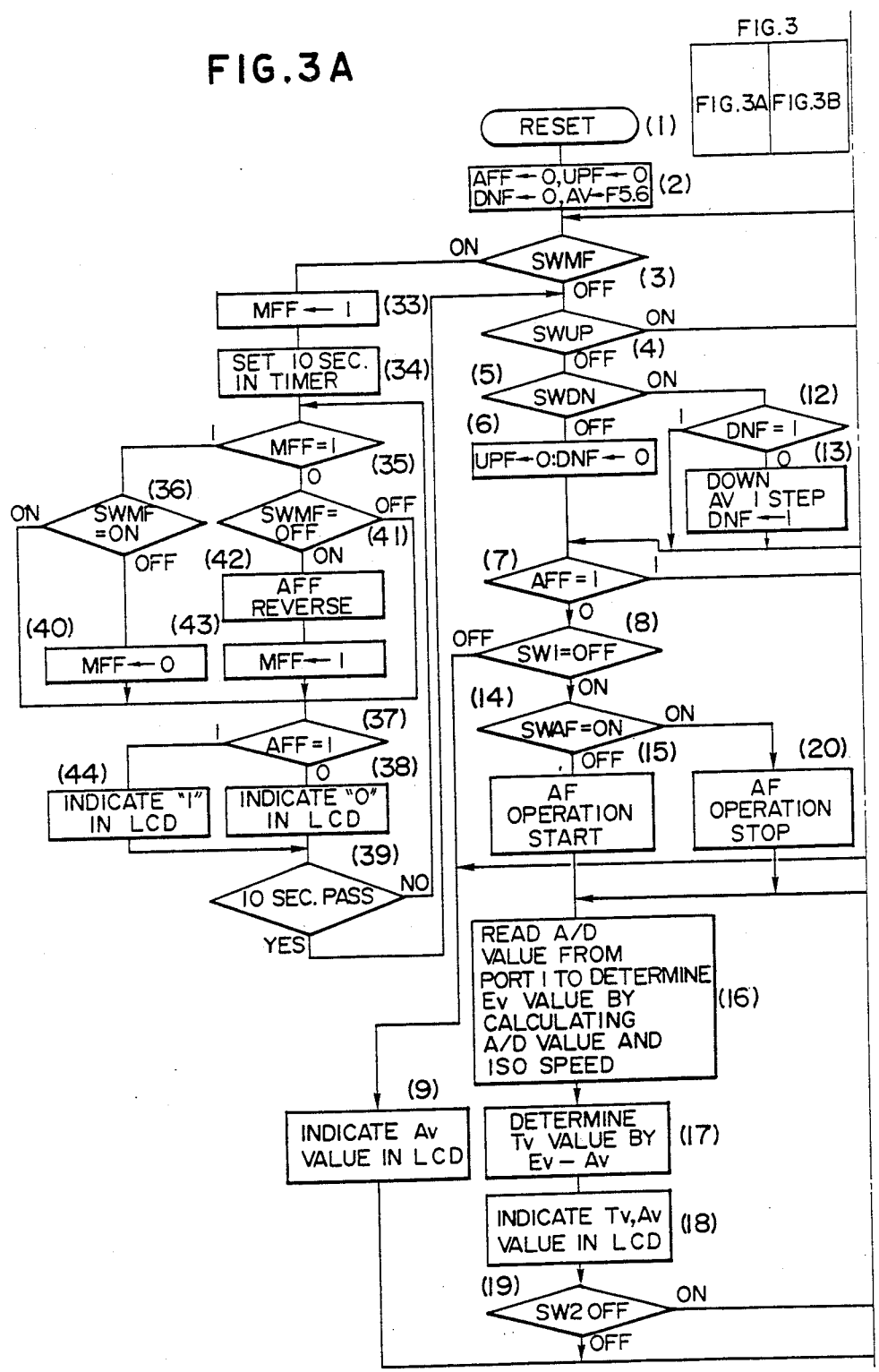
Figure 3B:
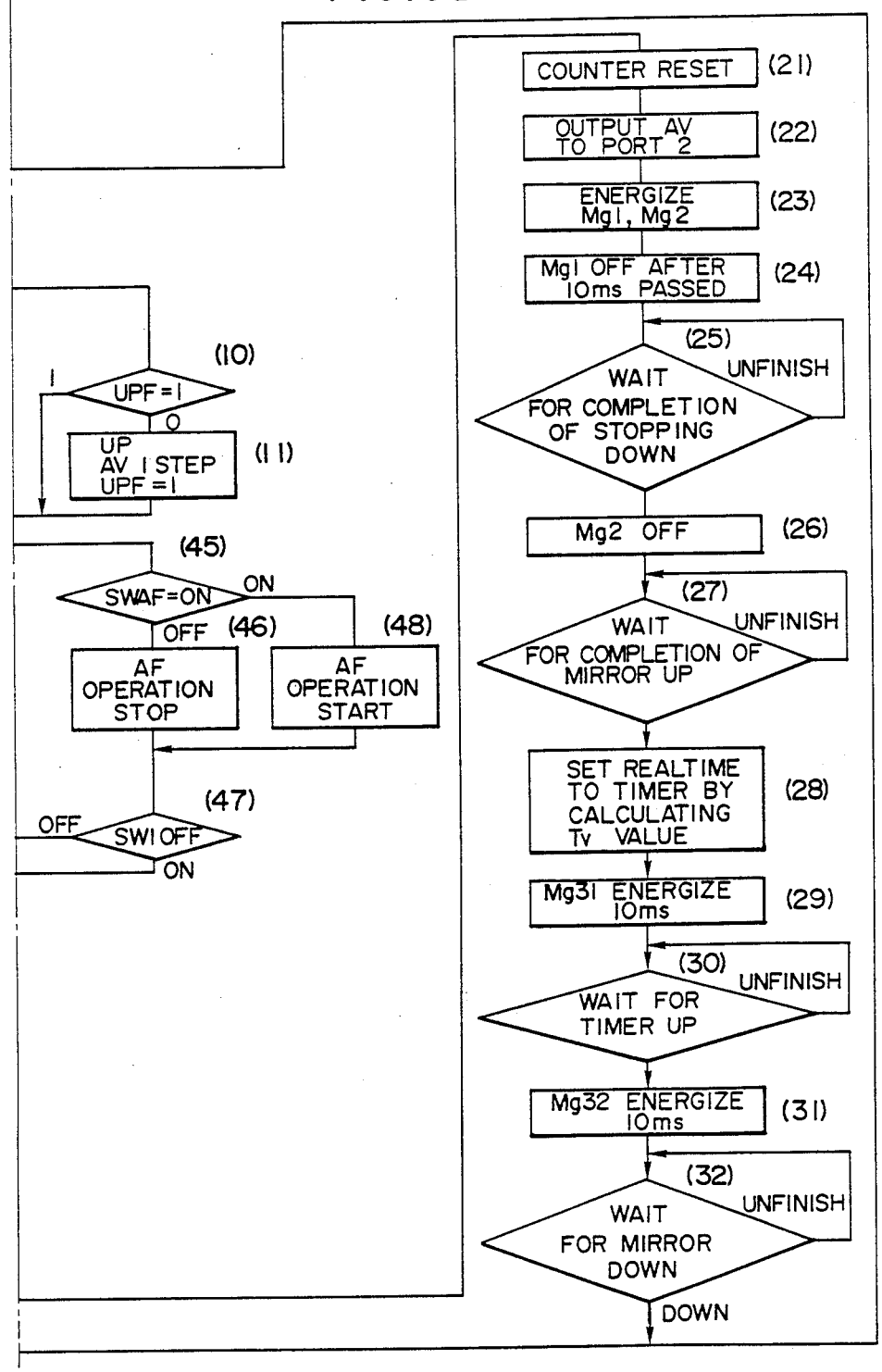

The operation of the camera will be described with reference to a control program flow chart shown in FIG. 3. The program is stored in a ROM in the microcomputer 11.

Flags in the microcomputer are represented by AFF, UPF, DNF, and MFF. The aperture value, the time value, and the exposure value are stored in registers AV, TV, and EV, respectively. Assume that a wind-up operation of the film is completed, the camera is ready for taking a picture, and all switches are kept off.

When a power switch (not shown) is depressed, the program starts to run. The microcomputer 11 starts control operations from step (1) RESET. More specifically, Step (1)

RESET

Step (2)

The flags AFF, UPF, DNF, and MFF are set to be "0", and the aperture value, i.e., an f-number, is set to be F5.6.

Step (3)

The switch 40 (SWMF) is checked. Since this switch is kept off, the flow advances to step (4).

Step (4)

The switch 42 (SWUP) is checked. Since this switch is kept off, the flow advances to step (5).

Step (5)

The switch 43 (SWDN) is checked. Since this switch is kept off, the flow advances to step (6).

Step (6)

The flags UPF and DNF are set to be "0". In this state, if the switches 42 (SWUP) and 43 (SWDN) are kept off, the flags UPF and DNF are cleared.

Step (7)

The flag AFF is checked. Since it is set to "0" in step (2), the flow advances to step (8).

Step (8)

The switch 37 (SW1) is checked. Since this switch is kept off, the flow advances to step (9).

Step (9)

The content of the AV register is supplied to the indication circuit 24 and the indicator 25 through the port PORT2, the AV value is supplied to the indicator, and the flow returns to step (3). Therefore, if no switches are turned on, only the aperture value is indicated in the LCD indicator 25. A loop of step (3) to step (9) is repeated. Since F5.6 is set in the AV register in step (2), this value is kept indicated during the above operation. When the above loop continues, the switch 42 (SWUP) is turned on upon depression of a button (not shown) by an operator, this is determined in step (4), and the flow is branched into step (10).

Step (10)

The UPF is checked. Since the UPF is already cleared in step (6), the flow advances to step (11).

Step (11)

The aperture value is increased by one step, and the flag UPF is set to "1". Since F5.6 is set in step (2), the content of the register AV is updated to F8. The flow advances to steps (7), (8), and (9), and F8 is indicated in the LCD indicator 25. When the flow advances to step (10) again, the flag UPF has already been set to be "1" in step (11). An operation in step (11) is not performed, and the aperture value is not increased. When the operator releases the button (not shown) to turn off the switch 42 (SWUP), the flow advances to steps (4), (5), and (6). The flag UPF is cleared in step (6). The operator depresses the button (not shown) to turn on the switch 42 (SWUP) again, and the aperture is increased by one step through steps (10) and (11). In the above operation, whenever the switch 42 (SWUP) is turned on, the aperture value is increased by one.

Similarly, when the operator depresses a button (not shown) to turn on the switch 43 (SWDN), the aperture is decreased by one through steps (5), (12), and (13). By operating the switches 42 (SWUP) and 43 (SWDN), an arbitrary aperture value can be set.

When the operator pans the camera toward the object and half-depresses a release button A, the switch 37 (SW1) is turned on. The operating state of the switch 37 (SW1) is checked in step (8), and the flow advances to step (14).

Step (14)

The operating state of the switch 39 (SWAF) is checked. Since this switch 39 is kept off, the flow advances to step (15).

Step (15)

An auto-focus operation is started. A signal of "1" appears at the output port P40 to actuate the auto-focusing device 12. The auto-focusing device 12 performs a distance-measuring operation (focus detection) by using an image signal received from the line sensor 8, thereby driving the photographing lens 2. Focus detection based on the image signal is performed. If a focusing state is shifted toward the nearest distance position from an in-focus position, outputs d and c are disabled (i.e., low signals) and outputs a and b are enabled (high signals). The transistors 14 and 17 are turned on to drive the motor 13 in the forward direction. Therefore, the photographing lens 2 is extended toward the infinity side. However, if the image signal represents a focusing state shifted toward the infinity position from the in-focus position, the outputs d and e are enabled and the outputs a and b are disabled. Under these conditions, the transistors 15 and 16 are turned on to retract the photographing lens 2 toward the nearest distance position When the in-focus state is obtained, the outputs a and d are enabled, and the outputs b and c are disabled. All the transistors 14 to 16 are turned off to stop moving the photographing lens 2. In this manner, while the output port P40 is set at high level, the auto-focusing device 12 repeats the auto-focus operation, and the object is continuously kept in the in-focus state. Therefore, if the flag TFF is set at logic "0", the auto-focus operation continues while the switch 37 (SW1) is kept on.

Step (16)

An output from the A/D converter 23 is fetch from the port PORT1. When a current proportional to the brightness of the object flows through the photodiode 10, the current is converted into a logarithmic compressed voltage by the diode 20 and the operational amplifier 18. This voltage is amplified by the resistors 21 and 22 and the operational amplifier 19. The amplified signal is input to the A/D converter 23. The A/D converter 23 converts a voltage into a digital value and this value is output to the port PORT1. The microcomputer 11 calculates the exposure value EV of the object in accordance with th input to the port PORT1 and an ISO sensitivity set by a setting circuit (not shown).

Step (17)

The microcomputer 11 calculates the EV value input to the register EV and the aperture value set in the register AV and calculates a difference (EV−AV) to obtain a shutter speed TV. The calculated shutter speed is input to the register TV.

Step (18)

The f-number or aperture value and a shutter speed as a time value are indicated in the indicator 25.

Step (19)

The operating state of the switch 38 (SW2) is checked. The switch 38 is kept off, and then the flow returns to step (3). The above steps are repeated while the switch 37 (SW1) is kept on so that auto-focus adjustment and auto-exposure operation for a photometric operation are repeatedly performed.

The auto-focus operation is repeatedly performed to focus the object. If the user wishes to fix the lens position, he or she depresses a member B to turn on the switch 39 (SWAF) while the release button A is half-depressed, i.e., the switch 37 (SW1) is kept depressed. The microcomputer then detects the ON state of the switch 39 (SWAF) in step (14). The flow is branched into step (20).

Step (20)

A signal of logic "0" appears at the output port P40 to interrupt the auto-focus operation. The subsequent operations are the same as the operation in the ON state of the switch 37 (SW1), thereby performing the auto-exposure operation. Therefore, the auto-exposure calculation can be performed while the AF (auto-focus) operation is kept interrupted.

After the switch 37 (SW1) is turned on to perform the auto-exposure operation, the user depresses the release button to the position corresponding to the second stroke to turn on the switch 38 (SW2). The ON state of the switch 38 (SW2) is detected in mode (19), and the flow is branched into a release routine in step (21).

Step (21)

The counter 26 is reset.

Step (22)

The AV value is output to the output port PORT2.

Step (23)

The output ports P41 and P42 go to high level to turn on the transistors 33 and 34 so that the magnets 29 and 30 are energized. Mechanical locking (not shown) is released by the magnet 30, and the mirror 3 is moved upward. The aperture is actuated to perform the stop-down operation.

Step (24)

A signal of logic "0" appears at the output port P42 after 10 ms have passed, thereby turning off the magnet 30.

Step (25)

The microcomputer waits for completion of stopping-down. When locking is released and then the magnet 29 is energized, the aperture is stopped down mechanically. The counter 26 counts a pulse from the switch 28 which is turned on and off every time stopping-down is performed by interlocking with an aperture mechanism (not shown). Since the counter 26 has been already reset in step (21), a signal of logic "0" is output from the output port P45 and the counter 26 is rendered operative. The counter 26 counts a pulse from the switch 28 which is turned on and off upon every stopping-down operation. When the count of the counter 26 which is stored in the register AV reaches a value corresponding to the desired AV value, the comparator 27 outputs a signal of logic "1", and this signal is transmitted to the output port P46. The microcomputer detects completion of aperture control, and the flow advances to step (26).

Step (26)

An output from the output port P41 goes to low level to turn off the magnet 29. When the magnet 29 is turned off, a ratchet (not shown) is actuated to stop the aperture.

Step (27)

The operating state of the switch 41 (SWMRUP) is detected, and the microcomputer waits for completion of mirror-up. When the mirror-up operation is completed and the switch 41 is turned on, these are detected and the flow advances to step (28).

Step (28)

The real time (expanded shutter speed) is calculated by the time value TV (APEX value) stored in the TV register and is set in the timer. The timer starts counting.

Step (29)

The magnet 31 is turned on to drive a shutter front curtain (not shown).

Step (30)

The timer counts the set real time. When the real time has passed, the flow advances to step (31).

Step (31)

The magnet 32 is turned on to drive the shutter rear curtain.

Step (23)

The operating state of the switch 41 (SWMRUP) is detected, and the microcomputer waits until the mirror-down operation is performed interlockingly with driving of the shutter rear curtain.

Aperture priority shutter control can be performed by the steps (21) to (32). After a series of release operations are completed, the flow returns to step (3).

The above operation is performed when the switch 40 is kept off. An operation will be described when the switch 40 is then turned on. An operation member (not shown) is operated to turn on the switch 40 (SWMF). In this state, the flow advances from step (3) to step (33).

Step (33)

A signal of logic "1" is set in the flag MFF. The flag MFF stores an operating state of the switch 40 (SWMF).

Step (34)

10 seconds are set in the timer, and the timer starts counting 10 seconds. Within 10 seconds, the operation of the switch 39 (SWAF) can be set.

Step (35)

The logic state of the flag MFF is checked. Since the flag MFF is set at logic "1" in step (33), the flow is branched into step (36).

Step (36)

The operating state of the switch 40 (SWMF) is checked. While the switch 40 is kept ON, the flow jumps to step (37), bypassing step (40).

Step (37)

The logic state of the flag AFF is checked. Since the flag AFF is set at logic "0" in step (2), the flow advances to step (38).

Step (38)

"0" is indicated in the LCD indicator 25.

Step (39)

The microcomputer checks if 10 seconds have passed. If 10 seconds have not passed, the flow returns to step (35).

In the above operations, steps (35), (36), (37), (38), and (39) are repeated while the switch 40 (SWMF) is kept on, and "0" is indicated in the LCD indicator 25.

Step (40)

When an operation of an operating member (not shown) is released to turn off the switch 40 (SWMF) during execution of the above steps, this state is detected in step (36) and the flow is branched into step (40). "0" is set in the flag MFF. When the flow advances to step (35) in the next cycle, the flow advances to step (41).

Step (41)

The operating state of the switch 40 (SWMF) is checked. If the switch 40 is kept off, the flow advances to step (37), bypassing steps (42) and (43). The flow returns to step (35) through steps (37), (38), and (39). In the above operation, if the switch 40 (SWMF) is turned on and then off and is kept off, the operations in steps (35), (41), (37), (38), and (39) are repeatedly performed.

Step (42)

During execution of the above operations, when an operation member (not shown) is operated to turn on the switch 40 (SWMF), this is detected in step (41). The flow is branched into step (42). The flag AFF is inverted and set at logic "1". The flow then advances to step (43).

Step (43)

The flag MFF is set at logic "1". When step (37) is then executed, the logic "1" of the flag AFF set in step (42) is detected in step (37). The flow is branched into step (44). "1" is indicated in the LCD indicator 25.

In the above operations, when the switch (SWMF) is turned on, a flag AFF setting mode is initiated. When the switch 40 (SWMF) is turned off and then on, the logic level of the flag is inverted. The above operation is repeated to arbitrarily set the logic state of the flag AFF. The logic level of the flag AFF can be indicated in the indicator 25 and can be visually checked. When 10 seconds have passed while the above operations are being performed, the time of the timer has elapsed. The flow returns to the initial state, i.e., step (4).

In the above operations, an operation will be described when the flag AFF has been set at logic "1". Even in this case, the operations of the switches 42 (SWUP) and 43 (SWDN) are the same as in the case wherein the flag AFF is set at logic "0", and a detailed description will be omitted.

When the flag AFF has been set at logic "1", the logic state of the flag AFF is detected in step (7), and the flow is branched into step (45).

Step (45)

The operating state of the switch 40 (SWMF) is checked. Since the switch 40 is kept off, the flow advances to step (46).

Step (46)

The auto-focus operation is interrupted.

Step (47)

The operating state of the switch 37 (SW1) is detected. If the switch 37 is kept off, the flow advances to step (9), and only the AV value is indicated in the LCD indicator 25.

Therefore, when the flag AFF has been set at logic "1", steps (3), (4), (5), (6), (7), (45), (46), (47), and (9) are repeated.

When the user depresses the member B to turn on the switch 39 (SWAF), the flow is branched from step (45) to step (48).

Step (48)

The auto-focus operation is performed in the same manner as in step (15).

The flow returns to step (3) through step (47).

When the flag AFF is set at logic "1" or the switch 39 is turned on, the operations in step (3) to (7), (45), (48), (47), and (9) are repeatedly performed to repeat a photometric operation and the focusing operation. When the member B is released to turn off the switch 39 (SWAF), the auto-focus operation is interrupted through step (46). In this case, focusing is performed while the switch 39 is kept on.

When the release button is depressed to a position corresponding to the first stroke while the switch 39 (SWAF) is not turned on, the switch 37 (SW1) is turned on. The flow is branched from step (47) into steps (16), (17), and (18). In the above operations, the brightness of the object is measured, and the shutter speed is measured. The shutter speed is indicated in the LCD indicator. However, unlike in the case wherein the AFF flag is set at logic "0", the auto-exposure operation is performed while the auto-focus operation is interrupted in step (46).

When the switches 39 and 37 are simultaneously turned on, the auto-focus operation is performed in step (48) and the auto-exposure calculation is performed in steps (16), (17), and (18). When the flag AFF is set at logic "1", the auto-focus operation depends on only the operation of the switch 39 (SWAF) independently of the auto-focus operation performed with the switch 37 (SW1).

What is claimed is:

1. A camera having an auto-focus device, comprising:
   (a) a first operation member;
   (b) an auto-focus control circuit having first and second modes, said auto-focus device being operated upon operation of said first operation member and said auto-focus device being disabled upon release of said first operation member in the first mode, and said auto-focus device being operated by a second operation member different from said first operation member and said auto-focus device being disabled upon operation of said first operation member in the second mode; and
   (c) selecting means for selecting the first or second mode.

2. A camera according to claim 1, wherein said second operation member comprises a release operation member for performing a photometric operation, said auto-focus device is operated while said first operation member is being operated independently of said release operation member in the first mode, and said release operation member is operated to perform the photometric operation and at the same time said auto-focus device is operated to perform an auto-focus operation, and said auto-focus device being disabled upon operation of said first operation member in the second mode.

3. A camera according to claim 1, wherein said auto-focus device detects a focus state during operation thereof on the basis of an output from a sensor, drives a lens in accordance with a detected focus state, and is disabled to interrupt driving of said lens.

4. A camera comprising:
   (a) a release operation member;
   (b) a second operation member;
   (c) a photometric calculation circuit for performing a photometric operation and a photometric calculation upon a photometric operation of said release operation member, said photometric calculation circuit being disabled when a photometric operative state of said release operation member is released;
   (d) an auto-focus circuit for performing a focus detection operation and driving a lens in accordance with a focus detection result;
   (e) an auto-focus control circuit for driving said auto-focus circuit upon operation of a second operation member independently of an operation of said release operation member and causing said auto-focus circuit to interrupt lens driving upon release of said second operation member in a first mode, and for driving said auto-focus circuit upon operation of said release operation member and causing said auto-focus circuit to interrupt lens driving upon operation of said second operation member in a second mode; and
   (f) selecting means for selecting the first or second mode.

5. A camera according to claim 4, wherein said auto-focus control circuit drives said auto-focus circuit upon the photometric operation of said release operation member in the second mode.

6. A camera having an auto-focus device, comprising:
   (a) a control circuit having a first mode for operating said auto-focus device independently of a photometric operation of a photometric circuit and a second mode for operating said auto-focus device upon the photometric operation of said photometric circuit; and
   (b) a selector for selecting the first or second mode.

7. A camera having an auto-focus device comprising:
   (a) a release operation member;
   (b) a first operation member;
   (c) an auto-focus control circuit having a first and second mode, the focusing operation of said auto-focus device being started upon operation of said release operation member and stopped upon operation of said first operation member in said first mode, and said focusing operation of said auto-focus device being started upon operation of said first operation member in said second mode.

* * * * *

UNITED STATES PATENT AND TRADEMARK OFFICE
CERTIFICATE OF CORRECTION

PATENT NO. : 4,887,117
DATED : December 12, 1989
INVENTOR(S) : Ryuichi Kobayashi It is certified that error appears in the above-identified patent and that said Letters Patent is hereby corrected as shown below:

FIG. 2 (Sheet 2):

Element 11, "MIRCO COMPUTER" should read
　　　　　--MICRO COMPUTER--.

COLUMN 2:

Line 49, "shows," should read --shows--.

COLUMN 3:

Line 17, "which," should read --which--.

COLUMN 5:

Line 9, "outputs d and e" should read --outputs d and c--.

Line 12, "position" should read --position.--.

Line 24, "fetch" should read --fetched--.

Line 35, "th" should read --the--.

COLUMN 6:

Line 67, "by" should read --with--.

UNITED STATES PATENT AND TRADEMARK OFFICE
CERTIFICATE OF CORRECTION

PATENT NO. : 4,887,117
DATED : December 12, 1989
INVENTOR(S) : Ryuichi Kobayashi It is certified that error appears in the above-identified patent and that said Letters Patent is hereby corrected as shown below:

COLUMN 7:

Line 14, "Step (23)" should read --Step (32)--.

COLUMN 10:

Line 48, "member;" should read --member; and--.

Signed and Sealed this

Ninth Day of July, 1991

Attest:

HARRY F. MANBECK, JR.

Attesting Officer

Commissioner of Patents and Trademarks